US009088984B2

(12) United States Patent
Beale et al.

(10) Patent No.: US 9,088,984 B2
(45) Date of Patent: Jul. 21, 2015

(54) SIGNALING MIMO ALLOCATIONS

(75) Inventors: Martin W. Beale, Kingsdown (GB); Vishakan Ponnampalam, Bristol (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 12/728,748

(22) Filed: Mar. 22, 2010

(65) Prior Publication Data

US 2010/0173643 A1    Jul. 8, 2010

Related U.S. Application Data

(63) Continuation of application No. 10/838,983, filed on May 4, 2004, now Pat. No. 7,684,372.

(51) Int. Cl.
| | | |
|---|---|---|
| *H04W 4/00* | (2009.01) | |
| *H04W 72/04* | (2009.01) | |
| *H04L 5/14* | (2006.01) | |
| *H04W 52/32* | (2009.01) | |
| *H04B 7/04* | (2006.01) | |
| *H04L 5/00* | (2006.01) | |
| *H04W 36/16* | (2009.01) | |

(52) U.S. Cl.
CPC ......... *H04W 72/0466* (2013.01); *H04L 5/0037* (2013.01); *H04L 5/0094* (2013.01); *H04L 5/1484* (2013.01); *H04W 52/322* (2013.01); *H04B 7/04* (2013.01); *H04L 5/0023* (2013.01); *H04W 36/16* (2013.01); *H04W 72/042* (2013.01)

(58) Field of Classification Search
CPC ............................... H04W 72/00; H04W 4/00
USPC ......... 370/335, 330, 332, 338, 329, 341, 334, 370/342; 455/517, 450, 451, 452.1
See application file for complete search history.

(56) References Cited

U.S. PATENT DOCUMENTS

| | | | |
|---|---|---|---|
| 6,026,082 A * | 2/2000 | Astrin | ........................... 370/336 |
| 6,370,129 B1 | 4/2002 | Huang | |
| 6,667,991 B1 | 12/2003 | Tzannes | |
| 6,683,916 B1 | 1/2004 | Sartori et al. | |
| 6,804,311 B1 | 10/2004 | Dabak et al. | |
| 7,020,110 B2 | 3/2006 | Walton et al. | |

(Continued)

FOREIGN PATENT DOCUMENTS

| | | |
|---|---|---|
| CN | 1384681 A | 12/2002 |
| JP | 3-163928 A | 7/1991 |

(Continued)

OTHER PUBLICATIONS

Extended European Search Report issued Oct. 4, 2010, in Patent Application No. 10169595.5.

(Continued)

*Primary Examiner* — Ajit Patel
*Assistant Examiner* — Michael Irace
(74) *Attorney, Agent, or Firm* — Oblon, McClelland, Maier & Neustadt, L.L.P.

(57) ABSTRACT

The present invention relates to demodulation of radio signals from a base station having collocated transmit antennas, and more particularly to signaling allocation information from a base station to a mobile terminal. The allocation information may include timeslot and code information of allocation to other mobile terminals. Some embodiments of the present invention facilitate a mobile terminal's ability to receive and demodulate a signal containing multiple interfering signals by communicating codes allocated to other mobile terminals.

4 Claims, 5 Drawing Sheets

Typical TDD radio frame

(56) References Cited

U.S. PATENT DOCUMENTS

| | | | |
|---|---|---|---|
| 7,085,248 B1* | 8/2006 | Holma et al. | 370/329 |
| 7,149,239 B2 | 12/2006 | Hudson | |
| 2001/0030956 A1* | 10/2001 | Chillariga et al. | 370/348 |
| 2002/0047775 A1 | 4/2002 | del Castillo et al. | |
| 2002/0163893 A1* | 11/2002 | Jeschke | 370/330 |
| 2002/0163896 A1 | 11/2002 | Hiramatsu | |
| 2002/0176390 A1* | 11/2002 | Sparr et al. | 370/338 |
| 2003/0076812 A1 | 4/2003 | Benedittis | |
| 2003/0117980 A1* | 6/2003 | Kim et al. | 370/332 |
| 2003/0125061 A1 | 7/2003 | Bysted et al. | |
| 2003/0181208 A1 | 9/2003 | Lobinger et al. | |
| 2004/0004949 A1* | 1/2004 | Cayla et al. | 370/338 |
| 2004/0066754 A1 | 4/2004 | Hottinen | |
| 2004/0081127 A1 | 4/2004 | Gardner et al. | |
| 2004/0179544 A1* | 9/2004 | Wilson et al. | 370/442 |
| 2004/0202262 A1 | 10/2004 | Demir et al. | |
| 2004/0253968 A1* | 12/2004 | Chang et al. | 455/513 |
| 2005/0070320 A1 | 3/2005 | Dent | |
| 2005/0111405 A1* | 5/2005 | Kanterakis | 370/328 |
| 2005/0135318 A1 | 6/2005 | Walton et al. | |
| 2005/0220000 A1 | 10/2005 | Kim et al. | |
| 2006/0245398 A1 | 11/2006 | Li et al. | |
| 2008/0181208 A1 | 7/2008 | Maes | |
| 2008/0225975 A1 | 9/2008 | Lee et al. | |
| 2009/0092090 A1* | 4/2009 | Beems Hart et al. | 370/329 |
| 2010/0311450 A1* | 12/2010 | Rinne et al. | 455/501 |

FOREIGN PATENT DOCUMENTS

| | | |
|---|---|---|
| JP | 10-509287 | 9/1998 |
| JP | 2002-232397 | 8/2002 |
| JP | 2003-523133 A | 7/2003 |
| JP | 2004-23716 | 1/2004 |
| JP | 2004-23716 A | 1/2004 |
| JP | 2004-135304 | 4/2004 |
| WO | WO 96/23362 A1 | 8/1996 |
| WO | WO 00/18029 | 3/2000 |
| WO | WO 01/58041 | 8/2001 |
| WO | WO 02/093819 A1 | 11/2002 |
| WO | WO 03/061150 | 7/2003 |

OTHER PUBLICATIONS

Extended European Search Report issued Oct. 1, 2010, in Patent Application No. 10169596.3.

International Search Report and the Written Opinion of the International Searching Authority Dated Jul. 21, 2005 under PCT/EP2005/051772.

Communication Pursuant to Article 94(3) EPC Dated Jun. 17, 2009 from European Applicaiton No. 05 738 036.2-1249.

3GPP (Sep. 2002). "3$^{rd}$ Generation Partnership Project; Technical Specification Group Radio Access Network; Physical Channels and Mapping of Transport Channels onto Physical Channels (TDD) (Release 4)," 3GPP TS 25.221 V4.6.0, pp. 1-90.

Extended European Search Report issued Nov. 12, 2010 in EP 10 16 9598.

Extended European Search Report issued Nov. 12, 2010 in EP 10 16 9599.

Japanese Office Action issued Nov. 2, 2010, in Patent Application No. 2007-512151 (with English-language translation).

"MIMO candidate techniques for UTRA TDD" R1-030445; TSG-RAN WG1 #32 meeting, Paris, France, May 19-23, 2003; Discussion and Decision.

English Translation of Decision of Rejection (Summary) in Japanese Patent Application No. 2007-512151 dated Dec. 13, 2011.

Office Action issued Mar. 7, 2012 in China Application No. 200580014231.7 (English Translation).

Office Action issued Feb. 27, 2012 in Korea Application No. 10-2011-7029807 (With English Translation).

Japanese Office Action issued Oct. 1, 2013 in Patent Application No. 2012-051430.

Japanese Office Action issued Jul. 9, 2013, in Japan Patent Application No. 2012-051430 (with English Translation).

Office Action issued Dec. 3, 2014 in Chinese Patent Application No. 200580014231.7 (with English translation).

* cited by examiner

Typical TDD radio frame

UTRA TDD timeslot configuration

Example signal at output of a TDD midamble detector

Implicitly broadcast resource allocation information

HSDPA frame structure

HS-SCCH structure for implicitly broadcasting allocation information

Broadcasting allocation information to terminals

Example of broadcast code allocation information in UTRA TDD

Transmission of broadcast resource allocation information via a separate code channel Broadcast transmission of code allocation information in midamble portion of burst

SIGNALING MIMO ALLOCATIONS

RELATED APPLICATIONS

This application is a continuation of U.S. patent application Ser. No. 10/838,983 entitled SIGNALING MIMO ALLOCATIONS and filed on May 4, 2004.

BACKGROUND OF THE INVENTION

1. Field of Invention

The present invention relates to processing radio signals in a CDMA system, and more particularly to signaling allocation information including, for example, which codes in which timeslots have been assigned to mobile terminals.

2. Description of Related Art

A cellular radio system or network may include multiple base stations and a number of mobile terminals. A base station may also be referred to as a node B. A mobile terminal may also be referred to as a mobile, a mobile radio, mobile transceiver or user equipment (UE). A mobile terminal may be fixed, stationary, portable, moveable and/or moving within a cell or between cells. A single base station may serve multiple mobile terminals by transmitting separable transmissions to each mobile terminal. A mobile terminal may determine which signals were directed to it and separate those signals from signals directed to other mobile terminals.

Signals may be separated in one or more domains. For example, signals may be separated in the time domain by transmitting time division multiple access (TDMA) modulated signals. Additionally, signals may be separated in the frequency domain by transmitting frequency division multiple access (FDMA) modulated signals. Also, signals may be separated in the code domain by transmitting code division multiple access (CDMA) modulated signals. Signals may be separated in the spatial domain by transmitting signals from collocated antennas. A cellular radio system may also employ a combination of these and/or other separation techniques.

In a CDMA system, multiple users may be supported via spread spectrum techniques. In a direct sequence CDMA system, a data payload is encoded with a code that may be orthogonal or pseudo-orthogonal to other codes. A mobile terminal may receive a CDMA modulated signal and may perform various demodulation operations such as matched filtering with one or more codes assigned to that mobile terminal.

When a base station modulates and transmits a CDMA signal encoded with a particular code, a mobile terminal may use a matched filter and the particular code assigned to it to produce a high output out of the matched filter. A matched filter using the particular code will produce a low output for signals directed to other mobile terminals, which are assigned other codes. As a result, a mobile terminal decodes only those signals with high matched filter outputs and therefore directed to it. Similarly, a mobile terminal rejects those signals with a low matched filter output and presumably directed towards a different mobile terminal.

Direct sequence CDMA systems commonly use either a frequency division duplex (FDD) scheme or a time division duplex (TDD) scheme. In an FDD system, communication between a mobile terminal and a base station occurs on two non-overlapping frequency bands. In a TDD system, communication between a mobile terminal and a base station may occur within a single frequency range. In either case, a data payload is transmitted between a mobile terminal and a base station. Uplink data or uplink traffic is transmitted from a mobile terminal to a base station. Downlink data or downlink traffic is transmitted from a base station to a mobile terminal.

In an FDD system, frequency separation is employed. Uplink traffic is transmitted at one center frequency and downlink traffic is transmitted at a different center frequency. The uplink and downlink may operate concurrently. That is, a mobile terminal may transmit data to a base station on an uplink at the same time that the base station is transmitting data on a downlink to the mobile terminal. The frequency separation in FDD systems ensures that the uplink does not interfere with the downlink.

In contrast, a TDD system employs temporal separation. A TDD system may transmit uplink and downlink data within a single frequency range, but at different times. An air interface link between a group of mobile terminals and a base station in a TDD cell may be organized in the time domain as a sequence of frames. Each frame may be arranged as a set of timeslots. Some timeslots may be allocated to uplink traffic while other timeslots may be allocated to downlink traffic. Each timeslot may be further subdivided in the code domain using a set of codes. Data is separated into codes with different orthogonal or pseudo-orthogonal codes from the set of codes. In order to facilitate decoding, the data transmitted on the code is separated into a data payload encoded with different orthogonal or pseudo-orthogonal codes, a training sequence and a guard period; the resulting structure consisting of data payload, training sequence and guard period is referred to as a burst.

To implement spatial diversity, a TDD base station may use two or more antennas. During downlink timeslots, a first set of bursts transmitted during a timeslot through a first antenna may be directed towards first group of mobile terminals and a second set of bursts transmitted during the same timeslot through a second antenna may be directed towards second group of mobile terminals. The first and second groups of mobile terminals may contain the same and/or different mobile terminals.

A base station may allocate a group one or more codes from one or more timeslots of a frame for downlink traffic. This allocation may be made for a first mobile terminal. A mobile terminal may receive data at higher rates with each additional code of a timeslot assigned to it. Furthermore, a base station may make these allocations in concurrent timeslots, each timeslot to be transmitted simultaneously over a different antenna. The base station informs each mobile terminal that it will receive downlink data by informing the mobile terminal of its allocated timeslots and codes. A mobile terminal then monitors the timeslots and decodes signals with the codes allocated to that mobile terminal.

FIG. 1 illustrates a typical frame structure for a TDD cellular radio network. A single TDD radio frame 100 may consist of 15 timeslots (Timeslots 1-16). Each timeslot consists of a set of bursts, the set may have up to 16 active coded signals using Codes 1-16. A base station transmits (on the downlink) zero, one or more bursts with one or more coded signals contained in each burst. Similarly, one or more mobile terminals each transmit zero, one or more bursts on the uplink, each burst containing one or more coded signals. The separate bursts on the uplink may be received as a single combined set of bursts by the base station.

A network may split a frame into downlink timeslots 101 and uplink timeslots 102. A network may make a symmetric division of downlink and uplink timeslots when mobile terminals transmit a similar volume of data as they receive. A network may configure an asymmetric service when a majority of the data flows in one direction. For example, interne traffic typically occupies a much larger volume of downlink data than up uplink data.

Frame 100 is configured to have 10 downlink timeslots (Timeslots 1-10) 101 and 5 uplink timeslots (Timeslots 11-15) 102. Also shown is allocation information for three mobile terminals (Terminals 1-3). The network has allocated four codes (Codes 3-6) of a single timeslot (Timeslot 3) to Terminal 1. These four codes are not shared with other mobile terminals. Also, the timeslot happens not to be shared with other mobile terminals and no codes are used in the timeslots just before or just after, therefore Terminal 1 should not suffer from intracell interference.

The network has allocated 6 codes to Terminals 2, namely Codes 2 & 3 in each of Timeslots 5-7. The network has also allocated 8 codes to Terminals 3, namely Codes 6 & 7 in each of Timeslots 5-8. Signals transmitted to Terminals 2 and 3 are multiplexed in each Timeslots 5, 6 and 7, therefore, the signals in these timeslots directed to one mobile terminal may interfere with signals directed to the other mobile terminal. Timeslot 8 is not code multiplexed with any other terminal except Terminal 3, therefore, Terminal 3 does not receive interference from other codes in Timeslot 8.

A typical TDD timeslot burst may contain multiple coded signals. Each burst may be considered as including three portions: a data payload, a training sequence and a guard period. Although the order and size of these portions within a burst may vary from system to system, a training sequence will typically be inserted as a midamble between two halves of the data payload. Alternatively, a training sequence may be placed at the head (preamble) or tail (postamble) of the data payload. Additionally, the guard period will typically be appended to the end and/or the beginning of the data payload and training sequence.

FIG. 2 illustrates segments of a TDD coded signal 200 from a single burst of one timeslot. The coded signal 200 includes a data payload (part 1) 201 followed by a midamble training sequence 202 followed by a remainder of the data payload (part 2) 203 followed by a guard period 204. This format of data payload 201, 203, training sequence 202 and guard period 204 may be used in cellular radio networks such as in a UTRA TDD mode system as specified by the third generation partnership project (3GPP).

In each timeslot, a set of bursts may be transmitted, where the burst contains one coded signal for each active code. Each coded signal may contain a unique training sequence or may contain a training sequence used by one or more of the other coded signals. A set of bursts may be distorted by a propagation environment in which a cellular radio system operates. The environment may provide multiple paths between a base station antenna and a mobile terminal antenna. A resulting radio channel may not be a perfect channel but rather a channel that combines delayed versions of a transmitted signal. For example, a signal transmitted from a base station and directed towards a mobile terminal may take multiple paths and these signal paths may be of different lengths. Hence, a burst or a signal may arrive at the mobile terminal as multiple facsimiles of the transmitted signal and each facsimile may arrive at different times due to the different length paths. A sequence of symbols within the signal may thus destructively interfere with each other.

For example, a transmitted signal traveling a short path arrives at a receiver first. The same transmitted signal traveling a longer path may appear at the receiver as a delayed version of the first received signal. Therefore, a first symbol traveling a longer path may arrive at a receiver at the same time a subsequent symbol traveling a shorter path arrives at the receiver. The mobile terminal may receive a signal comprised of a combination of one or more delayed versions of the transmitted signal. This phenomenon of overlapping symbols is known as intersymbol interference and may be caused by multipath propagation.

Intersymbol interference caused by multipath propagation also reduces orthogonality among signals having different codes. This loss of orthogonality among codes leads to a degradation in correlation properties and lower overall system performance. Furthermore, intersymbol interference may increase interference experienced by two signals having different codes transmitted in the same timeslot.

Referring to FIG. 1 for example, intersymbol interference may cause a loss of orthogonality among Codes 2, 3, 6 and 7 directed to Terminals 2 and 3 in each of Timeslots 5, 6 and 7. Additionally, intersymbol interference may cause a loss of orthogonality between Codes 6 and 7 of Terminal 3 in Timeslot 8. Unless a network employs mitigation techniques to reduce the impact of multipath, system performance may degrade.

A mobile terminal receiver may receive a signal containing traffic directed both to itself and to other mobile terminals. The mobile terminal receiver uses its assigned codes to extract data directed just to it. The encoded data directed to other mobile terminals in the same timeslot and from the same or a different antenna may interfere with the mobile terminal's reception and data extraction. A base station may increase its transmit power to compensate and overcome a perceived interference. Increasing transmit power, however, also increases interference in a network. Therefore, other means to process interfering signals may be useful.

SUMMARY

Some embodiments of the present invention facilitate a mobile terminal's ability to receive and demodulate a signal containing multiple interfering signals. A base station may communicate to a mobile terminal allocation information of other mobile terminal. Allocation information may include timeslot and code allocation information of other mobile terminals.

Some embodiments of the present invention provide a method of communicating code allocations in a cellular radio system, the method comprising: allocating to a first mobile terminal a first code in a timeslot; allocating to a second mobile terminal a second code in the timeslot; generating a message including an indication of the second code allocated to the second mobile terminal; and signaling to the first mobile terminal the message.

Some embodiments of the present invention provide a method of communicating code allocations by a base station in a cellular radio system, the method comprising: determining a first set of one or more codes in a timeslot to allocate to a first mobile terminal; determining a second set of one or more codes in the timeslot to allocate to a second mobile terminal; generating an allocation table that indicates the first and second sets of codes are allocated; and transmitting the allocation table.

Some embodiments of the present invention provide a method of compiling an allocation table in a first mobile terminal, the method comprising: monitoring one or more first channels; receiving a signal in a timeslot, wherein the signal includes a data payload and a training sequence; and extracting allocation information from the data payload.

Some embodiments of the present invention provide a method of compiling an allocation table in a first mobile terminal, the method comprising: monitoring one or more first channels for allocation messages; receiving on the first channels a first allocation message; receiving on the first channels a second allocation message; determining the first allocation message is directed to the first mobile terminal; determining the second allocation message is directed to a different mobile terminal; and building the allocation table from information received in the second allocation message, wherein the information includes a code allocated to the different mobile terminal.

Other features and aspects of the invention will become apparent from the following detailed description, taken in conjunction with the accompanying drawings which illustrate, by way of example, the features in accordance with embodiments of the invention. The summary is not intended to limit the scope of the invention, which is defined solely by the claims attached hereto.

DETAILED DESCRIPTION

Figure 1:
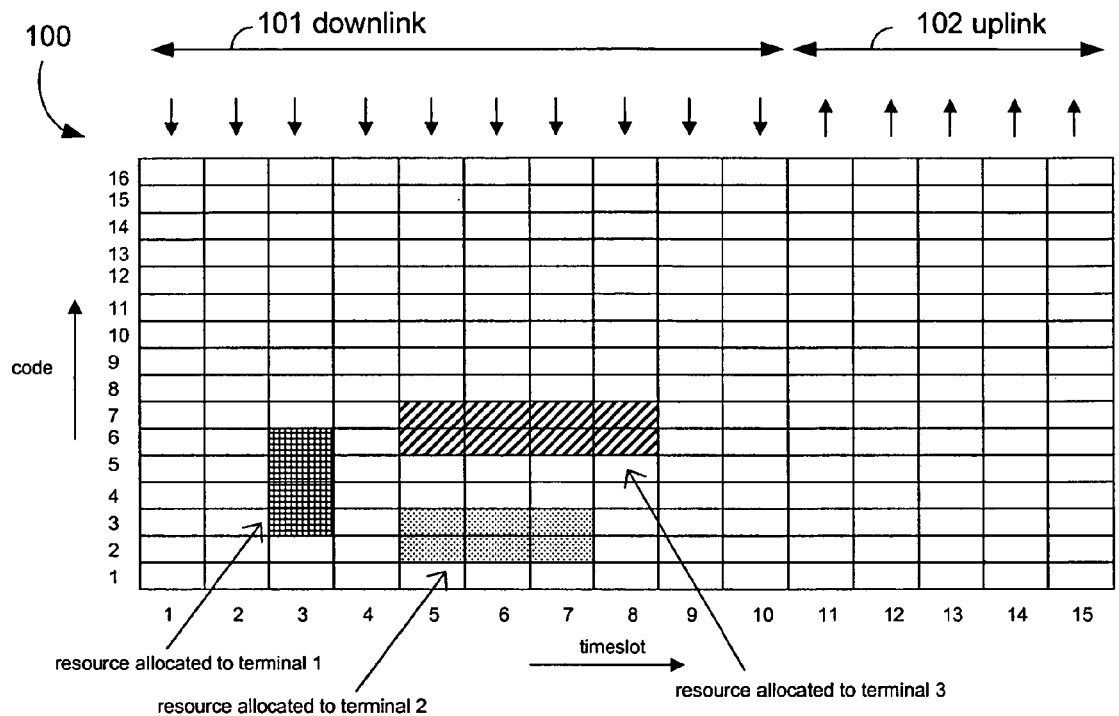
FIG. 1 illustrates a typical frame structure for a TDD cellular radio network.
Figure 2:
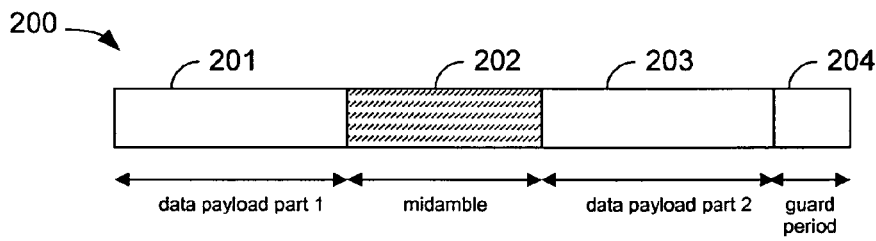
FIG. 2 illustrates segments of a TDD coded signal from a single burst of one timeslot.

In the following description, reference is made to the accompanying drawings which illustrate several embodiments of the present invention. It is understood that other embodiments may be utilized and mechanical, compositional, structural, electrical, and operational changes may be made without departing from the spirit and scope of the present disclosure. The following detailed description is not to be taken in a limiting sense, and the scope of the embodiments of the present invention is defined only by the claims of the issued patent.

Some portions of the detailed description which follows may be presented in terms of procedures, steps, logic blocks, processing, and other symbolic representations of operations on data bits that can be performed on computer memory. A procedure, computer executed step, logic block, process, etc., are here conceived to be a self-consistent sequence of steps or instructions leading to a desired result. The steps are those utilizing physical manipulations of physical quantities. These quantities can take the form of electrical, magnetic, or radio signals capable of being stored, transferred, combined, compared, and otherwise manipulated in a computer system. These signals may be referred to at times as bits, values, elements, symbols, characters, terms, numbers, or the like. Each step may be performed by hardware, software, firmware, or combinations thereof.

Several embodiments of the invention are described below with reference to 3GPP UTRA TDD systems, recommendations and specifications. These embodiments, however, are generally applicable to other mobile radio and cellular systems. Also see for example, co-pending application U.S. Provisional Application No. 60/568,194 filed on May 4, 2004, and titled "Midamble Allocation for MIMO Transmissions", which is herein incorporated by reference.

To increase overall system performance, a system may employ mitigation techniques to compensate for a loss of orthogonality among codes. Mitigation techniques may also reduce an impact of interference among signals within a timeslot that use code separation. Successive interference cancellation is an example of a mitigation technique applied in FDD systems. Multi-user detection (MUD) is an example of a mitigation technique applied in TDD systems.

A receiver employing a MUD circuit jointly decodes transmissions directed to multiple mobile terminals. By receiving and decoding signals directed to other receivers, a MUD circuit may cancel interference caused by an unwanted signal. One such unwanted signal may be a signal transmitted by a base station and received by one mobile terminal but directed to another mobile terminal.

A receiver MUD circuit or other mitigation circuit may use allocation information to improve signal quality of signals directed to a mobile terminal. Allocation information may include information about codes, timeslots, antennas and base stations allocated to and containing signals for other mobile terminals. Allocation information may also include information about transmissions in a present cell and/or information about transmissions of one or more neighboring cells. A mobile terminal may use allocation information to aid in decoding bursts of payload data directed to it.

Spatial diversity may be another technique to improve system performance. A transmitter and/or a receiver may use multiple antennas. Transmit diversity may be employed at the base station by transmitting from two or more antennas. A transmitter transmitting signals through more than one antenna may be referred to as a multi antenna transmitter. Transmit diversity may help a receiver by providing multiple copies through different channels of the same transmit signal. If severe degradation occurs in one channel from a first transmit antenna, a signal from a second transmit antenna traveling through a second channel may arrive at the receiver intact.

In a classic transmit diversity system, substantially the same data may be transmitted from multiple outputs, that is, from more than one transmit antenna. In accordance with some embodiments of the invention, a multiple antenna transmitter may transmit different signals on each antenna during one or more timeslots. For example, a transmitter having two antennas may transmit a common signal on both antennas while transmitting a group of bursts during a first sequence of timeslots. Alternatively, a transmitter may transmit the signal on one antenna and may transmit no signal through the second antenna during the first sequence of timeslots. The transmitter may then transmit two different signals, one unique signal on each antenna, during a second sequence of timeslots.

In a receive diversity system, a mobile terminal may have multiple receive antenna. A receiver receiving signals through more than one antenna may be referred to as a multi-antenna receiver. A first received signal from a first receive antenna and a second received signal from a second receive antenna may be processed to derive a first and second set of transmitted signals. For example, a receiver may use properties of a channel and code convolutions from each receive antenna to determine a signal transmitted from each transmit antenna.

A system having a transmitter with multiple antennas transmitting signals to a corresponding receiver having multiple antennas may be referred to as a multiple-input, multiple-output (MIMO) system. If the transmit antennas are sufficiently spatially separated (e.g., greater than one-half of a wavelength) and the receive antennas are sufficiently spatially separated, paths created between each pair of transmit and receive antennas may result in channels that are uncorrelated to some types of fading.

A system having multiple spatially separated transmit antennas, multiple spatially separated receive antennas, or both such as in a MIMO system may provide a unique channel between each pair of transmit and receive antennas. Although one channel may temporarily provide a receiver with a poor signal (e.g., due to the propagation conditions causing that path to fade), it is less likely that every channel created by each pair of transmit and receive antennas is simultaneously poor. As long as there is at least one acceptable channel between one transmit antenna and one receive antenna, a receiver may decode the transmitted signal.

A signal received from a particular transmit antenna may have a unique signature by virtue of the convolution of the code used to transmit that signal and the channel. This signature may allow a transmitter to transmit different information from each transmit antenna using the same code if the channels from each antenna are uncorrelated. For example, a transmitter may transmit in a particular timeslot on a first transmit antenna a first set of bursts having a set of signals encoded with a corresponding first set of codes. The transmitter may transmit in the same timeslot on a second transmit antenna a second set of bursts having a set of signals encoded using some of the same first set of codes.

By using spatial diversity and MIMO modulation and demodulation techniques, a system may increase throughput by transmitting different signals on collocated transmit antennas. This increased throughput results from increasing a number of transmit and receive antennas, thereby increasing an effective number of codes available in simultaneously transmitted timeslots.

Interference from other codes in the same timeslot, delayed symbols from multipath channels, bursts from a second antenna of a multi antenna transmitter, and bursts from neighboring cells increase a desire to actively employ mitigation techniques to reduce adverse effects of these signals.

In order to cancel interfering and unwanted signals destined for other terminals, it may be helpful for a receiver to know that these unwanted signals exist and to know with which codes these unwanted signals were encoded. Detection of unwanted signals may be performed by digital signal processing techniques. Alternatively, the existence of one or more coded signals destined to one or more other mobile terminals may be communicated to a mobile terminal.

A receiver may use signal processing techniques to determine which midambles have been transmitted. For example, a correlator may be used in a receiver to compare a received signal to a set of possible known training sequences. A correlator may produce a signal having peaks at various positions. The peaks may represent a channel estimate or characterization of a channel formed between a transmit antenna and a receive antenna. Positions of these peaks may also indicate which midambles have been transmitted.

A transmitter may select and transmit a set of midambles to indicate a particular configuration of codes used to encode data payload information. Once a receiver predicts a set of midambles transmitted by the transmitter, the receiver may use the midambles to determine a set of codes used to encode the data payload information. A default midamble allocation scheme may be used to map received midambles to a set of codes possibly used in a received timeslot.

Figure 3:
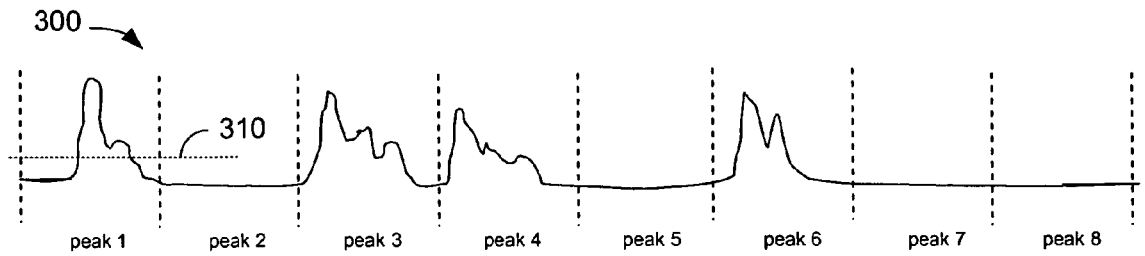
FIG. 3 shows an example signal at an output of a receiver's midamble detector.

FIG. 3 shows an example signal 300 at an output of a receiver's midamble detector. Signal 300 at the output of the midamble detector allows the receiver to determine which codes are active. For example, codes associated with Peaks 1, 3, 4 and 6 are shown having peaks above a threshold 310, therefore, codes associated with these midambles are active. A mobile terminal may also be able to use the output of the midamble detector to estimate or characterize a channel formed between a transmit antenna and a receive antenna. The channel estimate from this signal may be used to decode other signals in the timeslot, which used different codes.

A midamble may be used to relay information. A particular midamble may be used by a base station to represent codes that are active for a group of mobile terminal receivers. A different midamble may be used to represent a different group of codes that are active. A mobile terminal may determine which midamble was transmitted and thus infer which codes are present in a timeslot for other mobile terminals.

One mapping of midambles to active or in-use codes may be referred to as a default midamble allocation scheme. An example of a default midamble allocation scheme is described in a third generation partnership project document 3GPP TS 25.221 titled "Physical channels and mapping of transport channels onto physical channels (TDD)." If a base station uses the default midamble allocation scheme, the midamble is selected to allow a mobile terminal to determine which codes are being transmitted by a base station.

A base station may select a midamble thereby encoding a number representing a number of active codes transmitted in a timeslot by the base station. A base station may provide a one-to-one mapping between midambles used and the number of codes used. Each of the one or more bursts may be associated with one timeslot and may share a common midamble.

A base station may signal (to a mobile terminal) a message indicating a total number of different midambles used in a timeslot. Additionally, the midambles may be received as peaks at the receiver. Each midamble may be associated with one or more active codes. Therefore, the number of active codes in a timeslot may be greater than the number of midambles used in the timeslot. In this case, a mobile terminal may perform some additional signal processing to determine which of the codes associated with the midamble are active.

For example, if the base station signals that eight midambles are being used (UTRA TDD $K_{cell}=8$), and the mobile terminal midamble detector detects a Peak 6 corresponding to Midamble 6, then the mobile terminal may apply additional signal processing to determine which codes associated with Midamble 6 were actually transmitted.

A midamble may indicate that one code and/or another code were transmitted. In 3.84 Mcps UTRA TDD mode, Midamble 6 is associated with Codes 7 and 8 when $K_{cell}=8$ is used. Additional processing in the mobile terminal may determine that just Code 7 was transmitted, just Code 8 was transmitted, or both Code 7 and Code 8 were transmitted. Once a mobile terminal has deduced which codes are active, it can set up its interference mitigation function based on knowledge of those active codes. For example, the mobile terminal may feed a MUD circuit with a list of the codes determined to be active.

A cellular network may set a maximum number of midambles available by balancing the benefit and drawbacks of an increased number of midambles. An increased number of midambles allows a base station to encode a wider variety of code allocation configurations. In other words, by transmitting more unique midambles, the network allows a mobile terminal to make a more detailed accounting of codes that are active. An increased number of midambles, however, also increase noise seen by a receiver. Additionally, channel estimates are noisier and cover a shorter duration. On the other hand, by transmitting fewer unique midambles, a receiver may make a better channel estimation.

In order to perform improved interference mitigation, a TDD MIMO receiver may use knowledge of all codes transmitted on each of the antennas. Additionally, code-reuse may be employed across multiple antennas. Communicating codes that are active is exacerbated when MIMO is employed because there may be encoded payloads transmitted with the same code on multiple antennas. It may not be realistic to communicate an increased number of midambles using a default midamble allocation scheme or the like since this will significantly reduce channel estimation performance. Therefore, it may be necessary to have an alternate means that a base station may use to communicate to a mobile terminal as to which codes are active in a timeslot of a multi antenna transmitter.

A base station may communicate resource allocation information by selection of training sequences as described above. Alternatively, a base station may communicate allocation information of mobile terminals by a signaling message to a mobile terminal, by broadcasting information to a set of mobile terminals, or by encoding a message on a training sequence. A mobile terminal receiver may use resource allocation information to aid in decoding signals transmitted by a base station. The mobile terminal may use this information to set up its MUD circuits in order to improve detection and decoding performance. When a mobile terminal has knowledge of neighbor cell code allocations as well, it may be able to mitigate intercell interference from these neighbors.

In accordance with some embodiments of the inventions, an allocation message directed to a mobile terminal includes code allocations of other mobile terminals. A base station may instruct a mobile terminal as to which codes it has been assigned. These instructions my be in a form of an allocation message.

Allocation information may be explicitly included in an allocation message signaled from a base station to a mobile terminal. Allocation information may be in the form of a bit map or an allocation table, for example. When a mobile terminal is instructed as to its allocated codes and timeslots, a base station may also transmit a table or the like indicating code allocations to other mobile terminals.

In accordance with some embodiments of the inventions, a mobile terminal may monitor allocations directed to other mobile terminals. A mobile terminal may build an allocation table by decoding allocation messages that are destined to itself and destined for other terminals. Allocation information is thereby implicitly communicated to mobile terminals in a cell. A base station may encode allocation messages such that all mobile terminals to which an allocation has been made may decode an allocation message to any other mobile terminals that is active.

Figure 4:
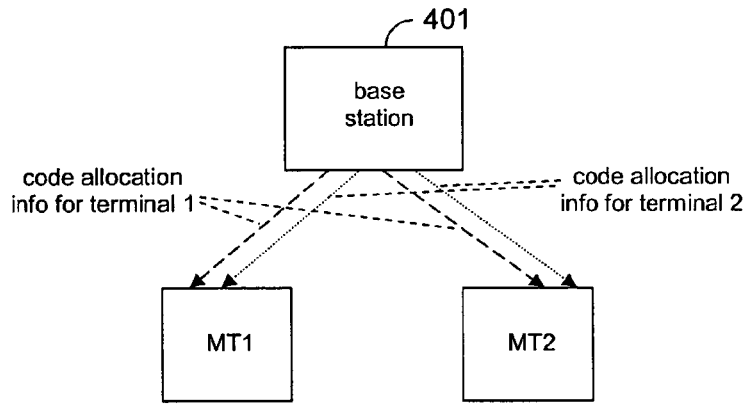
FIG. 4 shows resource allocation information implicitly communicated to each mobile terminal receiving an allocation.

FIG. 4 shows resource allocation information implicitly communicated to each mobile terminal receiving an allocation. A base station 401 transmits resource allocation information in a manner such that a first mobile terminal (MT1) may receive and decode the resource allocation messages intended for MT1 and a second mobile terminal (MT2). MT1 may use allocation information sent to MT2 to mitigate interference caused by a signal intended for MT2. Similarly, MT2 may receive and decode the resource allocation messages for both MT2 and MT1. MT2 may use allocation information sent to MT1 to mitigate interference caused by a signal intended for MT1.

In order to provide for high speed downlink packet data transmission, UTRA TDD supports a high speed downlink packet access (HSDPA). HSDPA is particularly suited for application of MIMO techniques. In HSDPA, the base station transmits allocation information to a mobile terminal on a high speed shared control channel (HS-SCCH).

Figure 5:
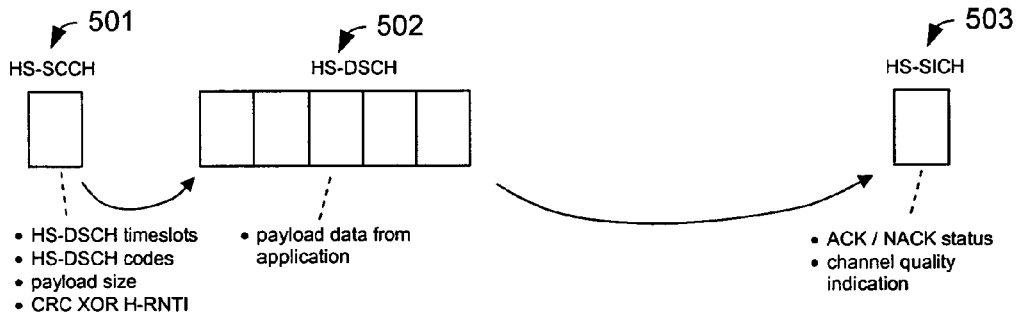
FIG. 5 shows a timing and flow diagram of a HSDPA transmission.

FIG. 5 shows a timing and flow diagram of a HSDPA transmission. HSDPA transmissions use HS-SCCH 501, HS-DSCH 502 and HS-SICH 503 channels. HS-SCCH 501 carries allocation information to a mobile terminal. The information includes an indication of specific HS-DSCH codes and timeslots active and allocated for that mobile terminal. HS-DSCH 502 carries payload data, such as application data. HS-SICH 503 carries an acknowledgement status and a channel quality indication.

In a classical UTRA TDD mode system, the HS-SCCH information communicated to a mobile terminal does not include codes that are assigned to other mobile terminals. Furthermore, an allocation message transmitted on the HS-SCCH may be decoded only by the mobile terminal to which that allocation is directed. An identity (H-RNTI) of a mobile terminal is used for scrambling of the HS-SCCH. That is, the HS-SCCH is protected by cyclic redundancy check (CRC) bits that are masked by a mobile terminal identity. The CRC bits of a message on the HS-SCCH are encoded by replacing the CRC bits with an exclusive-OR of the CRC bits with an identity of the mobile terminal.

In HSDPA, a mobile terminal determines which codes have been allocated to other mobile terminals by classical midamble processing methods such as those enabled by default the midamble allocation scheme. Therefore, one mobile terminal may not decode messages directed to other mobile terminals in a classical system. In operation, a mobile terminal monitors a set of HS-SCCH channels for allocation messages. The mobile terminal masks a CRC received on the HS-SCCH with its identity (H-RNTI). A CRC test may fail or may pass. A CRC test may fail because the HS-SCCH is destined for another mobile terminal, in which case the masking operation will cause a CRC failure. Alternatively, a CRC test may fail because there are too many errors in the HS-SCCH message. If there are too many errors, the HS-SCCH is unreliable and is ignored. If the CRC test fails, then the mobile terminal does not decode a HS-DSCH message indicated in the HS-SCCH information. If a CRC test is successful, the mobile terminal decodes the HS-SCCH information. In either case, the mobile terminal then continues to decode other HS-SCCHs within the HS-SCCH set to which it is monitoring.

In accordance with some embodiments of the inventions, an allocation message includes an identity of the mobile terminal and a CRC. Neither the allocation message nor the CRC bits are scrambled by a mobile terminal identity.

Figure 6:
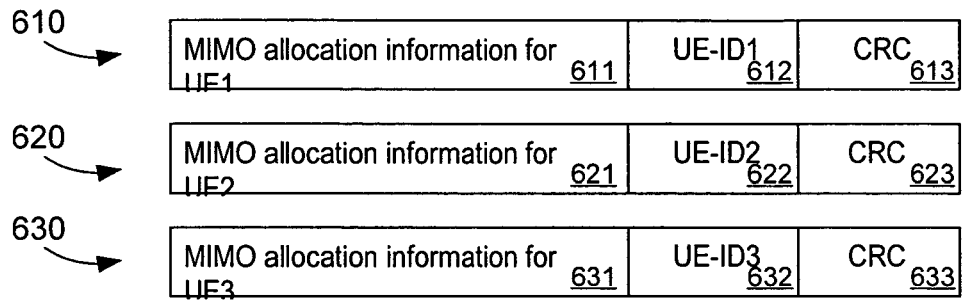
FIG. 6 shows allocation messages for three mobile terminals.

FIG. 6 shows allocation messages 610, 620, 630 for three mobile terminals (UE1, UE2 & UE3). The allocation information indicates which codes of which timeslots are allocated to a mobile terminal. Part of the MIMO allocation information may include an indication as to which transmit antenna a code is allocated. For example, MIMO allocation information for UE1 611 may include the code allocation for UE1 (e.g., Codes 3, 4, 5 and 6 on MIMO Timeslots 5 and 6 on both antennas). MIMO allocation information for UE2 621 may include the code allocation for UE2 (e.g., Codes 10 and 11 in MIMO Timeslots 6-8) and MIMO allocation information for UE3 631 may include the code allocation for UE3 (e.g., Codes 1 and 2 in MIMO Timeslots 5-8 on Antenna 2). Each allocation message 610, 620, 630 may also contain a mobile terminal identity 612, 622, 623 and CRC bits 613, 623, 633.

Allocation information directed to a mobile terminal may be transmitted to a mobile terminal in a timeslot at the start of the frame. This timeslot may be a non-MIMO timeslot. Allocation information to each mobile terminal may be transmitted on different physical channels in this timeslot. For example, Code 1 in Timeslot 1 may carry an allocation for UE1. Code 2 in Timeslot 1 may carry an allocation for UE2. Code 3 in Timeslot 1 may carry an allocation for UE3. A mobile terminal may monitor Timeslot 1 and determine where an allocation for it is being transmitted.

A mobile terminal may decode all the allocation messages in order to gain information on all the allocations that are active in the frame. If the mobile terminal decodes an allocation message containing its identity (UE-IDx), it may set up its receiver based on that allocation message. In order to decode a subsequent data bearing allocation, the mobile terminal may set up its receiver to decode allocated codes in a particular timeslot. For example, UE2 may decode Codes 10 and 11 on MIMO Timeslots 6-8 from Antenna 1. A mobile terminal may also set up its receiver with the information regarding all other allocations in the frame for the purposes of improved detection (e.g., via a MUD circuit). For example, each mobile terminal may collate the code allocation information from all 3 HS-SCCH allocation messages and may deduce that:

in MIMO Timeslot 5, Codes 3-6 are active on Antenna 1 and Codes 1-6 are active on Antenna 2;

in MIMO Timeslot 6, Codes 3-6 and 10, 11 are active on Antenna 1 and Codes 1-6 are active on Antenna 2;

in MIMO Timeslot 7, Codes 10-11 are active on Antenna 1 and Codes 1-2 are active on Antenna 2; and in MIMO Timeslot 8, Codes 10-11 are active on Antenna 1 and Codes 1-2 are active on Antenna 2.

In this manner, a mobile terminal is able to compile information on all allocations in a frame with the same effect as if the code allocations had been explicitly signaled or broadcast.

In accordance with some embodiments of the inventions, a base station broadcasts allocation information to mobile on a broadcast channel.

Figure 7:
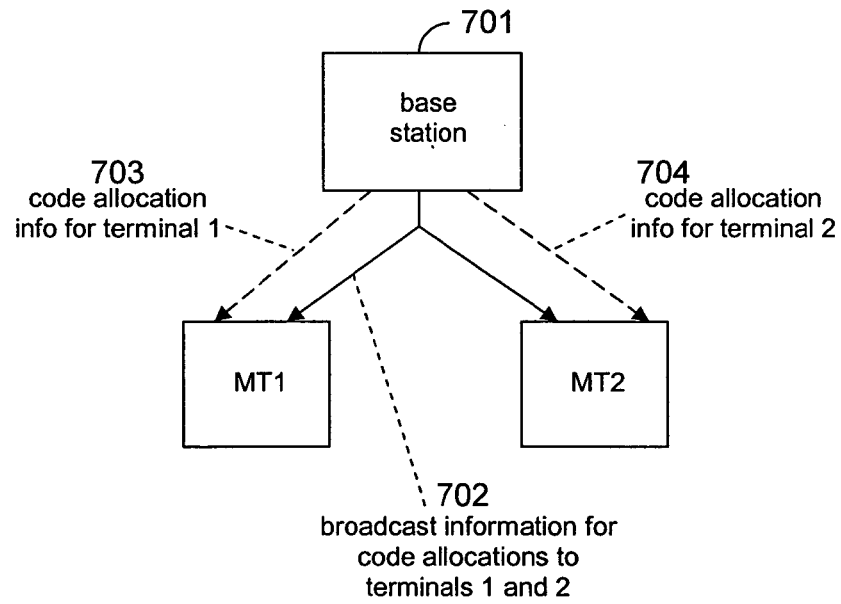
FIG. 7 shows a base station communicating allocation information to two mobile terminals.

FIG. 7 shows a base station 701 communicating allocation information to two mobile terminals. A base station 701 broadcasts a message 702 to all mobile terminals monitoring a broadcast channel. For example, a base station 701 determines that it will allocate codes from one or more timeslots to a first mobile terminal (MT1). Base station 701 also determines that it will allocate a set of codes from one or more timeslots to a second mobile terminal (MT2). Base station 701 broadcasts a message 702 throughout the cell to all monitoring mobile terminals. The broadcast message includes allocation information. The allocation information indicates which codes in which timeslots and on which antennas have been allocated. The timeslots may be single source timeslots or may be MIMO timeslots. In the MIMO case, the allocation information includes a set of resources used on each antenna. When the timeslots period begins having allocated codes, base station 701 encodes and transmits a timeslot containing each of the data payloads destined to mobile terminals with an allocated code for that non-MIMO timeslot or MIMO timeslot.

In some embodiments of the invention, a base station may use a specific broadcast channel to communicate resource allocation information of each mobile terminal to monitoring mobile terminals. In some embodiments of the invention, a base station broadcasts resource allocations on a channel used to provide cell setup parameters to mobile terminals. In UTRA TDD, this may be via system information (SIB) signaling. In this case, resource allocation may be constant for multiple frames until the SIB signaling is refreshed with a newly defined resource allocation.

Figure 8:
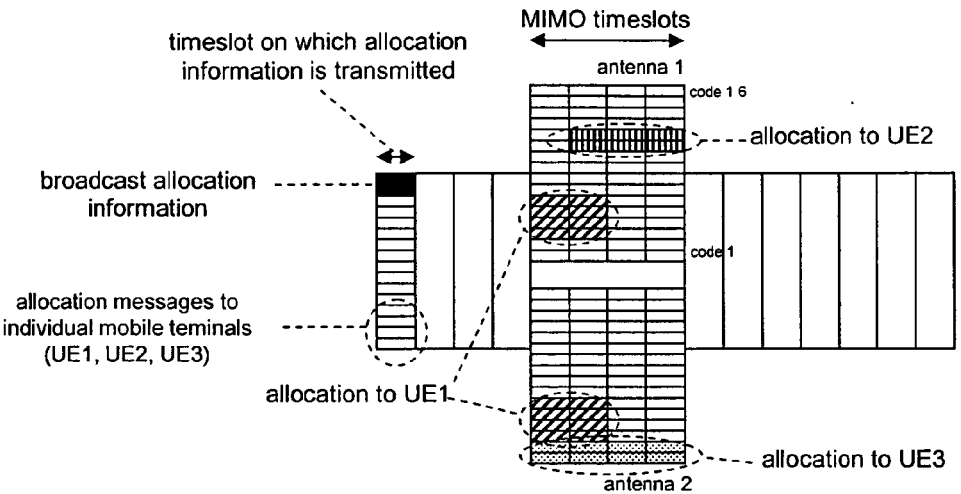
FIG. 8 shows an example of resource allocation information broadcast in a frame.

FIG. 8 shows an example of resource allocation information broadcast in a frame. In this example, there are two transmit antennas, 16 codes per timeslot, 15 timeslots of which 4 timeslots are used for MIMO transmissions. Theoretically, a MIMO timeslot using two antennas may carry twice as many codes as a non-MIMO timeslot through code re-use. MIMO Timeslots 5-8 may include different signals on each antenna. That is, data payload in a MIMO timeslot transmission on a first antenna may be different than data payload in the MIMO timeslot on a second antenna. Non-MIMO Timeslots 1-4 and 9-15 may transmit the same signal on each antenna. Alternatively, non-MIMO Timeslots 1-4 and 9-15 may transmit a signal on just one or the other antenna.

The figure shows a base station that has allocated codes to three mobile terminals (UE1, UE2 and UE3). A base station allocated to a first mobile terminal (UE1) Codes 3, 4, 5 and 6 in both MIMO Timeslots 5 and 6 on both Antennas 1 and 2. The base station allocated to a second mobile terminal (UE2) Codes 11 and 12 in MIMO Timeslots 6-8 on Antenna 1 only. The base station allocated to a third mobile terminal (UE3) Codes 1 and 2 in MIMO Timeslots 5-8 on Antenna 2 only. Broadcast information is transmitted in Codes 15 and 16 at the start of the frame in Timeslot 1. The broadcast information may apply to the whole frame. In general, this broadcast information may be transmitted anywhere in the frame. For example, the code allocation information for Timeslot n+1 could be transmitted in Timeslot n.

If the mobile terminal has been allocated a code in a timeslot, it may also extract the allocation information (or a subset thereof) for all mobile terminals from the broadcast allocation information. For example, a base station may broadcast code allocation information about MIMO timeslots using codes 15 and 16 of timeslot 1 as a bit map or bit strings. The bit map may appear as follows:

Timeslot 5: 0011110000000000:1111110000000000
Timeslot 6: 0011110000110000:1111110000000000
Timeslot 7: 0000000000110000:1100000000000000
Timeslot 8: 0000000000110000:1100000000000000

In the above described messages a "1" indicates that the corresponding code is present whereas a "0" indicates that the base station is not transmitting payload data with that code. The bit string prior to the colon refers to the code allocation information for Antenna 1 and the bit string that succeeds the colon refers to the code allocation on Antenna 2. It is understood that there are various ways to encode broadcast code allocation information. In general, coding other than a direct bitmap may be used. As an example of another form of signaling, the base station may apply compression to the message. Alternatively, the base station may signal the first code and last code that are allocated in a timeslot on an antenna. The mobile terminals may assume by default that all codes or determined which codes in between the first code and last code are also transmitted or it may determine which codes in between the first codes and the last code are also transmitted, for example by further signal processing means.

In accordance with some embodiments of the inventions, a base station signals allocation information to mobile using a dedicated or code or codes. In some embodiments of the invention, a base station uses a separate broadcast channel to transmit code allocation information. The base station may define certain timeslots that are to be used for MIMO HSDPA transmissions. For example, a base station may broadcast a message in each timeslot. The message in the timeslot identifies which codes have been allocated and are active for that MIMO HSDPA timeslot. Alternatively, the message in the timeslot identifies which codes are allocated in subsequent timeslots.

In some embodiments of the invention, code allocation information may be transmitted via a separate code channel. In UTRA TDD, this code channel may be based on a chip sequence that is not currently used for Codes 1-16 of a UTRA TDD signal. This broadcast channel may be modulated with a broadcast code allocation information. In some embodiments of the invention, a base station may transmit a separate code channel only in the MIMO timeslots. This separate code channel may be transmitted in addition to the 16 codes that the MIMO transmitter might be transmitting.

Figure 9:
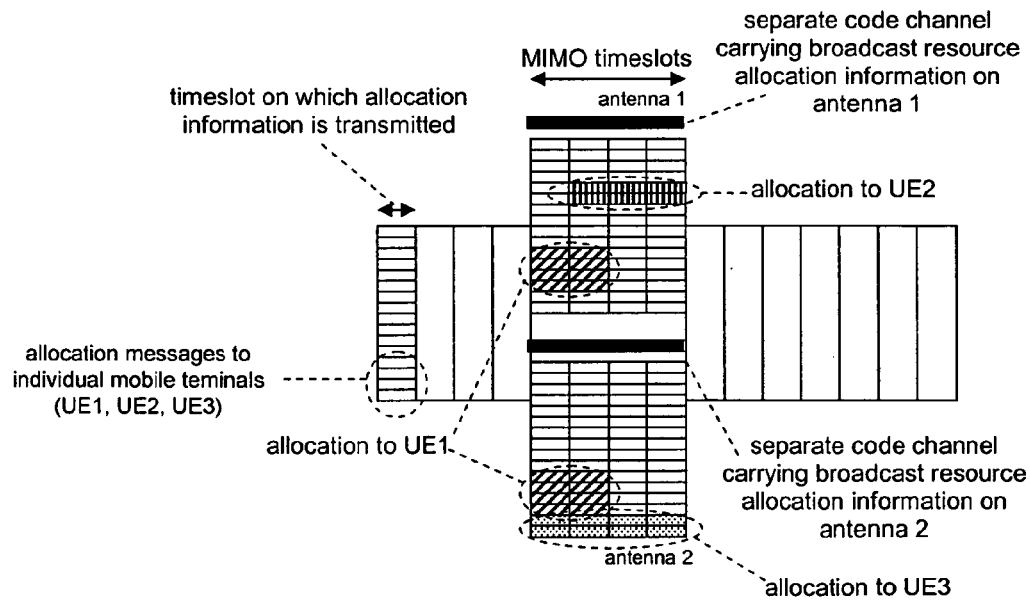
FIG. 9 shows separate code channels being transmitted from two antennas.

FIG. 9 shows separate code channels being transmitted from both Antenna 1 and Antenna 2. Alternatively, only a single separate code channel is transmitted. That is, the same separate code channel is transmitted from both antennas.

In accordance with some embodiments of the inventions, a base station transmits allocation information during a training sequence. The separate code channel discussed above does not have to extend throughout the timeslot. For example, the separate code channel may exist only during the midamble portion of the data burst.

The separate code channel may be transmitted identically from each antenna. Alternatively, different versions of the same information may be transmitted from each antenna. This provides a degree of diversity that may improve system performance. For example, when a separate code channel is transmitted only during the midamble portion of the data burst, the burst structure used when there are two transmit antennas may contain a midamble sequence with codes in different orders.

Figure 10:
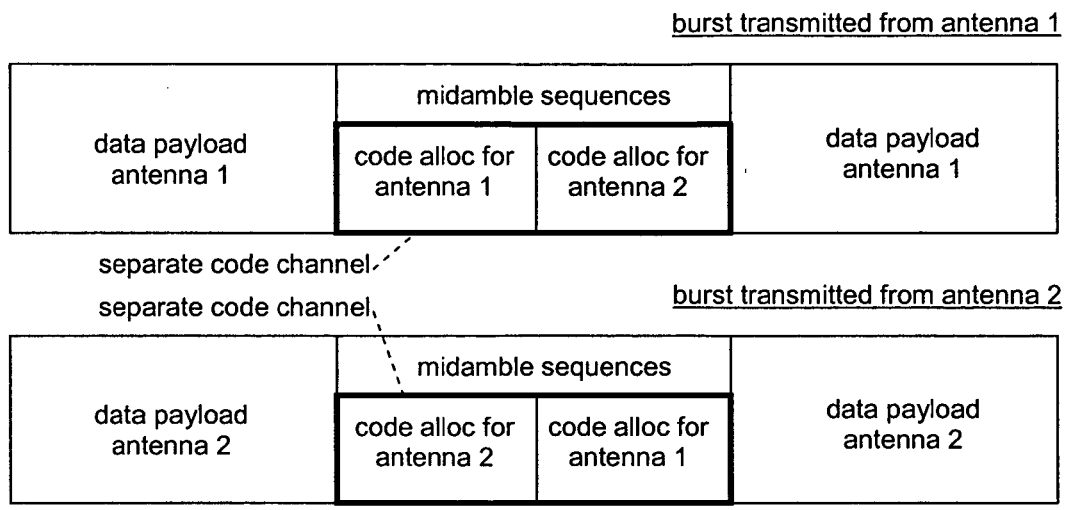
FIG. 10 shows a separate code channel transmitted from two transmit antennas.

FIG. 10 shows a separate code channel transmitted from two transmit antennas: Antenna 1 and Antenna 2. When transmitted on Antenna 1, the separate code channel transmits code allocation information for both antennas. Similarly when transmitted on Antenna 2, the separate code channel transmits code allocation information for both antennas. The separate code channel on Antenna 1 is constructed to carry the code allocation information for Antenna 1 followed by the code allocation information for Antenna 2. The separate code channel on Antenna 2 is constructed to carry the code allocation information for Antenna 2 followed by the code allocation information for Antenna 1. By transmitting code allocation information on both antennas, antenna diversity benefits may be realized. By varying the construction of the separate code channel on each antenna, time diversity benefits may be realized.

A base station having four antennas may transmit from a first antenna code allocation information for Antenna 1 followed by code allocation information for Antennas 2-4. A second antenna may be used to transmit code allocation information for Antenna 2 followed by code allocation information for Antennas 3, 4 and 1. A third antenna may be used to transmit code allocation information for Antenna 3 followed by code allocation information for Antennas 4, 1 and 2. A fourth antenna may be used to transmit code allocation information for Antenna 4 followed by code allocation information for Antennas 1-3.

In some embodiments of the invention, allocation information relating to a data-bearing timeslot may be transmitted by a base station in a timeslot prior to that data-bearing timeslot.

Signaling or broadcasting of allocation information may occur aperiodically or periodically. For example, in some embodiments, a broadcast channel transmissions occurs when there are changes to code and timeslot allocations. When a new resource is allocated or released, a broadcast channel may signal the updated resource allocation information. In some embodiments, current resource allocation information is communicated to a mobile terminal when the mobile terminal makes a request for the information.

In other embodiments, a broadcast channel may be periodic. For example, a broadcast channel may occur once per frame. A broadcast channel may broadcast resource allocation information at the start of the frame and include information for each relevant timeslot in the frame. In other embodiments, a broadcast channel occurs once per active timeslot. A broadcast channel may broadcast resource allocation information for each active timeslot on a timeslot-by-timeslot basis. The broadcast channel may broadcast allocation information for the current frame or timeslot. Alternatively, the broadcast channel may broadcast allocation information for a future frame or timeslot.

In some embodiments of the invention, allocation information transmitted by a base station may include both allocation information for resources in a cell in which the terminal is positioned and allocation information for resource allocations in neighbouring cells. In some embodiments of the invention, a base station may transmit broadcast messages including resource allocation information about a neighboring cell. For example, some of the broadcast messages may apply to resource allocations in a current cell and other broadcast messages may apply to resource allocations in surrounding or neighboring cells.

The broadcast nature of the broadcast resource allocation signaling may be implied by virtue of a base station ensuring that all mobile terminals that might use the information may receive and decode all allocation messages.

In some embodiments of the invention, a base station signals or broadcasts resource allocation information for each mobile terminal to all active mobile terminals in a cell. Allocation information may be transmitted to a specific mobile terminal or a specific group of mobile terminals or may be broadcast to all mobile terminals or a category of mobile terminals.

In some embodiments of the invention, a base station may broadcast information to a subset of the mobile terminals in a cell. For example, if the base station determines only a subset of the terminals in a cell will benefit from broadcast resource allocation information, then the base station only broadcasts to those mobile terminals. In some embodiments, a base station transmits a signal, message or broadcast at a power level sufficient for all allocated mobile terminals to receive.

For example, a HS-SCCH is typically power controlled by the base station. The base station may use just sufficient a level of transmit power on the HS-SCCH to allow a mobile terminal, to which the HS-SCCH message is directed, to successfully decode that HS-SCCH message.

In some embodiments of the invention, allocation information may be transmitted at a power level sufficient only for mobile terminals of interest to decode. For example, some mobile terminals may require that a base station transmit signals at a higher power level than other mobile terminals. If all mobile terminals having allocated resources require less signal power than a group of distant mobile terminals, a base station may set a power level that allows the mobile terminals having allocated resources to receive the allocation message but the power level may not be high enough for the distant mobiles to receive. That is, a base station may broadcast allocation information at a power level that is just sufficient enough for mobile terminals having allocated resources to receive. The base station may not use a power level required to reach all mobile terminals in the cell.

In some embodiment of the invention, the base station may apply a level of power to the broadcasts containing code allocation information that is sufficient to allow a group of mobile terminals to decode the broadcast code allocation information. For example, if the downlink transmit power levels that would be required to receive code allocation information by five mobile terminals in a cell were +10 dBm, +15 dBm, +12 dBm, +20 dBm and +8 dBm for mobile terminals UE1, UE 2, UE 3, UE 4 and UE 5, respectively, and if only UE1, UE 2 and UE 3 were allocated codes in the frame, then the base station would use a downlink transmit power of +15 dBm, which is the maximum power required for UE1, UE 2 and UE 3 to receive the code allocation information.

In some embodiments of the invention, a base station may transmit code allocation messages at a power level that is just sufficient for mobile terminals receiving the message to decode all of the allocation messages transmitted in the cell. For example, if downlink transmit powers required to transmit code allocation information to 5 mobile terminals in the cell were +10 dBm, +15 dBm, +12 dBm, +20 dBm and +8 dBm for UE1, UE2, UE3, UE4 and UE5 respectively and if only UE1, UE2 and UE3 are allocated codes in a frame, then a base station may apply a downlink transmit powers of +15 dBm for the allocation message to UE1, +15 dBm for the allocation message to UE2, and +15 dBm for the allocation message to UE3. Classically, powers of +10 dBm, +15 dBm and +12 dBm would have been applied to each of these allocation messages respectively, but this power allocation would not allow UE2 to successfully derive the total allocation information for all mobile terminals in the cell.

While the invention has been described in terms of particular embodiments and illustrative figures, those of ordinary skill in the art will recognize that the invention is not limited to the embodiments or figures described. For example, many of the embodiments described above reference a transmitter in a base station and a receiver in a mobile terminal. In other embodiments, the transmitter is in a mobile terminal and the receiver is in a base station. Additionally, many embodiments describe or included a midamble. In other embodiments, a preamble or a postamble training sequence is used.

The figures provided are merely representational and may not be drawn to scale. Certain proportions thereof may be exaggerated, while others may be minimized. The figures are intended to illustrate various implementations of the invention that can be understood and appropriately carried out by those of ordinary skill in the art.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention be limited only by the claims and the equivalents thereof.

What is claimed is:

1. A method of communicating training sequence allocations in a cellular radio system, the method comprising:
   allocating to a first mobile terminal a first plurality of training sequences in first plurality of timeslots in a frame, said first plurality of training sequences for communicating data between the first mobile terminal and a base station;
   allocating to a second mobile terminal a second plurality of training sequences in second plurality of timeslots in the frame, said second plurality of training sequences for communicating data between the second mobile terminal and the base station;
   generating a message indicating that the first plurality of training sequences has been allocated in the first plurality of timeslots in the frame to the first mobile terminal and the second plurality of training sequences has been allocated in the second plurality of timeslots in the frame to the second mobile terminal using a processor; and
   signaling to the first mobile terminal and the second mobile terminal the message,
   wherein the message is allocated during a period prior to the first plurality of timeslots and the second plurality of time slots in the frame, and
   wherein the message further includes an indication of allocated training sequences of a neighboring cell.

2. The method of claim 1, wherein the act of signaling includes transmitting the message on a control channel monitored by the first mobile terminal.

3. The method of claim 1, wherein the act of signaling includes transmitting the message on a broadcast channel monitored by the first mobile terminal.

4. The method of claim 1, wherein the act of signaling includes:
   determining a power level such that both the first and second mobile terminals receive the message; and
   transmitting the message on a broadcast channel at the determined power level.

* * * * *